United States Patent [19]

Peterson

[11] 4,000,231

[45] Dec. 28, 1976

[54] METHOD FOR COMPACTING POWDERS

[75] Inventor: William M. Peterson, Troy, Mich.

[73] Assignee: Hydramet American Inc., Royal Oak, Mich.

[22] Filed: Sept. 16, 1974

[21] Appl. No.: 506,107

[52] U.S. Cl. .............................. 264/40.2; 264/109; 264/111; 264/120; 264/334; 264/336; 425/78; 425/149; 425/344; 425/356

[51] Int. Cl.$^2$ .......................... B29C 3/00; B29C 7/00

[58] Field of Search .......... 264/120, 109, 111, 334, 264/335, 40, 336, 297; 425/78, 149, 344, 356, 135

[56] References Cited

UNITED STATES PATENTS

| | | | |
|---|---|---|---|
| 1,803,814 | 5/1931 | Spengler et al. | 264/120 |
| 2,449,257 | 9/1948 | Tucker | 425/78 |
| 2,569,226 | 9/1951 | Carter | 264/120 |
| 2,573,141 | 10/1951 | Heinrich | 425/812 |
| 2,675,581 | 4/1954 | Payne | 425/344 |
| 2,825,092 | 3/1958 | Hatch et al. | 425/78 |
| 2,926,412 | 3/1960 | Stacy et al. | 425/149 |
| 3,060,506 | 10/1962 | Uschmann | 425/344 |
| 3,103,698 | 9/1963 | Wollett | 264/120 |
| 3,279,021 | 10/1966 | Pratt et al. | 425/344 |
| 3,545,045 | 12/1970 | Vinson | 425/78 |
| 3,664,784 | 5/1972 | Sibley | 425/78 |
| 3,758,245 | 9/1973 | Hermes | 425/78 |
| 3,775,032 | 11/1973 | Smith et al. | 425/78 |

*Primary Examiner*—Willard E. Hoag

*Attorney, Agent, or Firm*—Barnes, Kisselle, Raisch & Choate

[57] ABSTRACT

Method of using an opposed ram hydraulic press for compressing powder in a die to form a compact. The press including hydraulic and electrical control circuits for decompressing the compact progressively and smoothly to a relatively low punch hold down force and maintaining this hold down force relatively constant until the compact is substantially completely ejected from the die.

9 Claims, 10 Drawing Figures

METHOD FOR COMPACTING POWDERS

Figure 1:
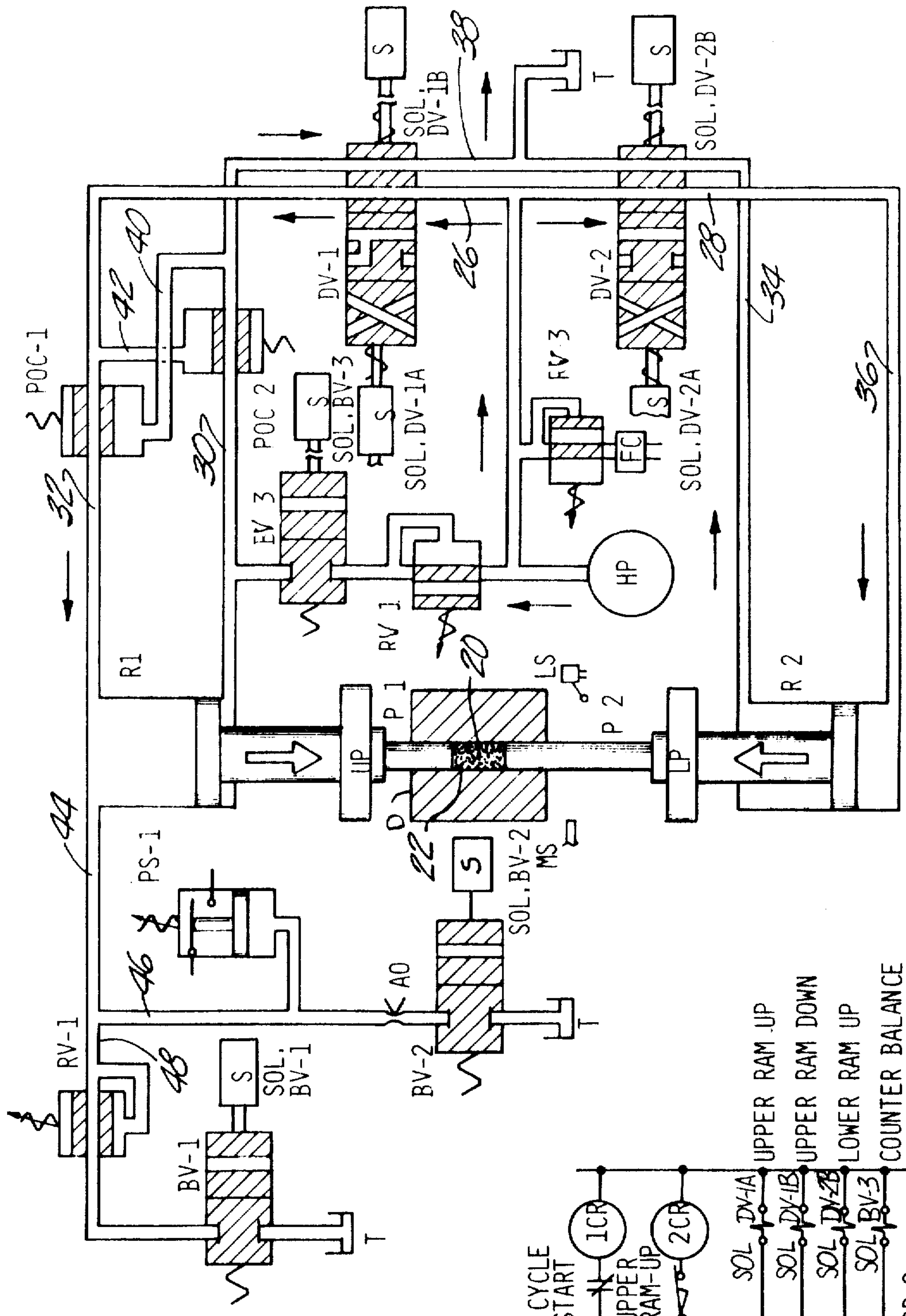
Figure 1A:
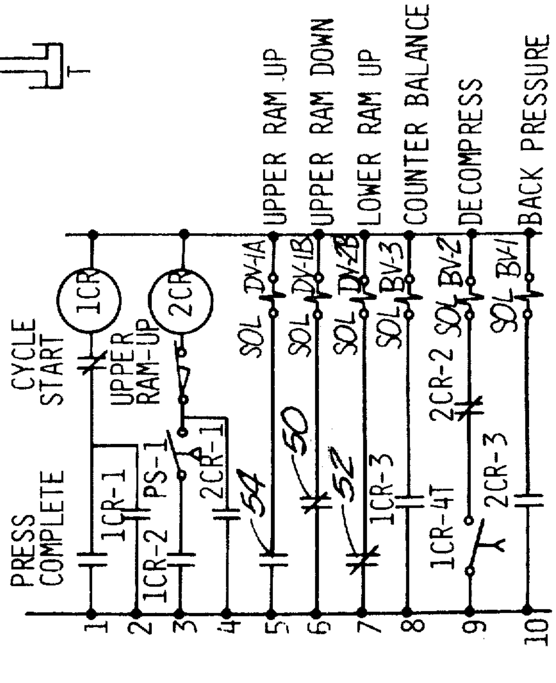

This invention relates to a method for compressing powder into compacts.

In my co-pending application Ser. No. 497,573, filed Aug. 15, 1974 now U.S. Pat. No. 3,890,413, dated June 17, 1975, there is disclosed a method and apparatus for compacting powder simultaneously in a plurality of cavities in a die arranged between opposed rams of a hydraulic press. My prior application is directed primarily to a means and method for obtaining uniform compacts simultaneously in a plurality of die cavities in spite of the impracticability of filling all of the die cavities with exactly the same amount of powder.

The present invention is directed to the solution of another related problem in the compaction of powder pellets. When uranium-dioxide and other powders are compressed into compacts or pellets between opposed plungers in a die cavity it is essential to maintain force on the opposite ends of the compact while it is being ejected from the die. For example, in an opposed ram hydraulic press where the compact is ejected by driving the lower ram upwardly, it is necessary to maintain top punch pressure on the compact until it has been substantially completely ejected from the die. Experience has shown that this hold down pressure is necessary to eliminate cracks or laminations in the finished compact which result from abrupt pressure changes within the compacted powder.

Heretofore it has been proposed to maintain force on the compact while it is being ejected from the die by adjusting the upspeed of the upper ram during ejection to the same eject speed of the lower ram, thereby keeping both the upper and lower punches in pressure contact with the opposite ends of the compact during ejection. However, as a practical matter, it is impossible to adjust both ram speeds to identical values. Furthermore, ram speeds vary as a result of decreasing die wall friction as the compact moves upwardly out of the die cavity. As a result of these practical problems it has also been proposed to provide an adjustable spring float between the upper punch and the upper ram. This float is normally adjustable up to about three-quarters of an inch and allows the upper ram to start moving up while the upper punches remain in pressure contact with the compact. The resulting hold down pressure on the compact consists of the weight of the tooling and the upper platen and the spring pressure developed between the upper platen and the upper ram. While this float is sufficient in most instances to compensate for varying ram speeds, the amount of hold down pressure is not adjustable other than by changing the spring load. Furthermore, the hold down pressure does vary during ejection, depending upon the amount of spring compression. Even though this spring float arrangement reduces the need for critical control of the ram speeds, it still requires very fine adjustment and an increase of set-up time. Also, with this method of ejection both rams are decompressed to a predetermined low value (for example, 500 pounds) before the ejection stroke is started and then the force on the compact is increased when the ejection stroke is initiated. It is believed that the resulting shock on the compact is responsible for the start of a lamination crack.

The present invention has for its object the provision of a method and apparatus for compacting powder in an opposed ram press wherein the compact is decompressed smoothly and without shock while it is being ejected from the die.

More specifically, the present invention involves the application of a controlled counterbalancing force to the upper ram during ejection to thereby progressively reduce the hold down force applied to the compact to a predetermined positive low value before the compact is completely ejected from the die.

Furthermore, the present invention contemplates a method and apparatus for compacting powder wherein the lower ram is caused to move upwardly in a generally continuous mode, both during pressing and ejection to thereby minimize the required time cycle of the operation.

Other features and objects of the present invention will become apparent from the following description and accompanying drawings, in which:

FIGS. 1, 2, 3, 4 and 5 illustrate in a diagrammatic manner the hydraulic components of the press control circuit during successive portions of the press and eject cycle according to the present invention; and FIGS. 1A, 2A, 3A, 4A and 5A are schematic electrical diagrams showing the condition of the various electrical components of the control circuit during the corresponding successive portions of the press and eject cycle according to the present invention.

Referring to the drawings, a conventional hydraulic press is illustrated diagrammatically as having opposed upper and lower rams R1 and R2, respectively. Ram R1 drives an upper platen UP and ram R2 drives a lower platen LP. Vertically aligned punches P1 and P2 are mounted on the upper and lower platens respectively. A die D is fixedly mounted between the two rams. The die has a cylindrical cavity 20, the axis of which is aligned vertically with the axis of punches P1 and P2. Cavity 20 is sized to have a close fit with the punches and is adapted to be filled with powder so that, when the punches are advanced toward each other, they compress the powder to form a compact or pellet 22.

The opposed rams of the press are powered from a hydraulic power unit HP capable of developing sufficient pressure to apply the desired compacting force to the upper and lower ends of the powder column in cavity 20 to compress the powder to the desired extent. A conduit 24 extends from the outlet of power unit HP and divides into two branch conduits 26,28. The maximum pressure developed in conduit 24 is controlled by an adjustable relief valve RV-3, the outlet of which is connected to a flow switch FC. Branch conduits 26,28 are connected to the pressure ports of directional valves DV-1 and DV-2, respectively. These directional valves are of the three-position, four-way type; they are spring centered and solenoid operated, as illustrated. One cylinder port of valve DV-1 is connected to the rod end of the cylinder of ram R1 by a conduit 30. The other cylinder port of valve DV-1 is connected to the cap end of the cylinder of ram R1 by a conduit 32. In the same manner, the cylinder ports of valve DV-2 are connected to the rod and cap ends of the cylinder of ram R2 by conduits 34,36, respectively. The tank ports of valves DV-1 and DV-2 are connected to tank T by a common conduit 38.

Pilot operated check valves POC-2 and POC-1 are arranged in conduits 30,32, respectively. Both of these check valves permit free flow in the direction towards the cylinder of ram R1. The pilot line 40 of valve POC-1 connects with conduit 30 on the inlet side of check valve POC-2 and the pilot line 42 of check valve POC-2 connects with conduits 32 on the inlet side of check valve POC-1.

The outlet conduit 24 of power unit HP is also connected to the inlet port of an adjustable pressure reducing valve RV-2. The outlet of valve RV-2 is connected to the pressure port of a blocking valve BV-3. Valve BV-3 is solenoid operated with a spring return to the blocking position thereof. The outlet port of valve BV-3 connects with conduit 30 on the outlet side of check valve POC-2.

The cap end of the upper ram cylinder R1 has an outlet conduit 44 extending therefrom. Conduit 44 divides into branch conduits 46,48, each of which discharges to tank. In conduit 46 there is arranged a blocking valve BV-2 and in conduit 48 there is arranged a blocking valve BV-1. These valves are solenoid operated with a spring return to the blocking position. On the inlet side of valve BV-2 there is arranged in conduit 46 an adjustable orifice AO. Upstream of orifice AO an adjustable pressure switch PS-1 is connected with conduit 46. In conduit 48 there is arranged an adjustable relief valve RV-1 on the inlet side of the valve BV-1.

In FIG. 1 the various components of the hydraulic circuit are shown in the condition they assume during the press portion of the cycle immediately prior to the moment where the desired maximum pressure is developed in conduit 24. At this stage in the cycle solenoid DV-1B is energized by closed contacts 50 (reference line 6 in FIG. 1A). Likewise, solenoid DV-2B is energized by closed contacts 52 (reference line 7 in FIG. 1A). Contacts 50,52 were initially closed in response to the closing of the cycle start switch (reference line 1). Thus, with the spools of valves DV-1 and DV-2 in the positions shown in FIG. 1, the cap ends of the cylinders of rams R1 and R2 are both connected to the power unit and the rod ends of these cylinders are both connected to tank through conduits 30,34,38; both check valves POC-1 and POC-2 are open. Thus, punches P1 and P2 apply compacting forces to the opposite ends of the powder column in cavity 20.

Figures 2, 2A:
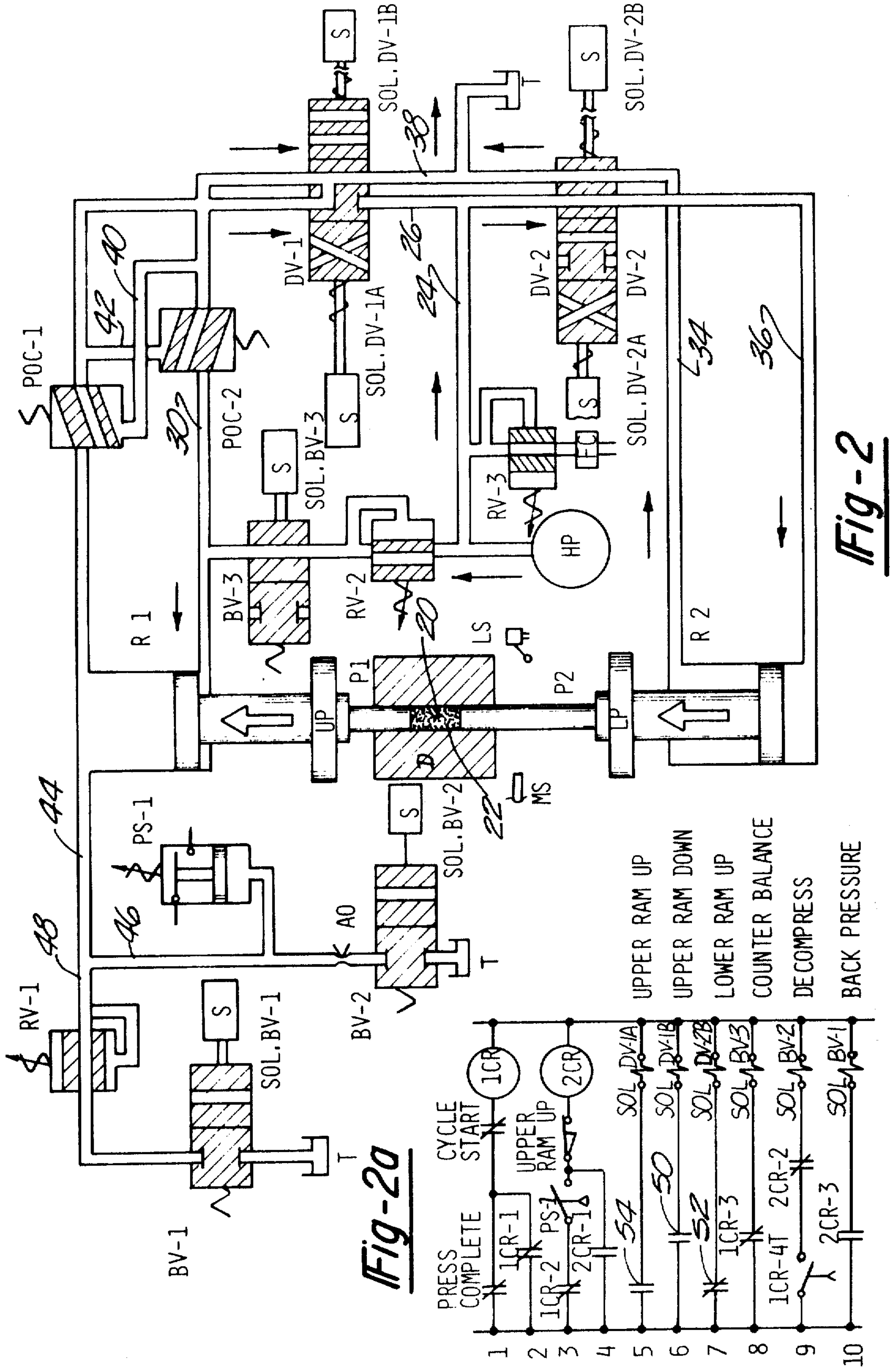

When the pressure developed by power unit HP attains a predetermined high value corresponding to the desired maximum compacting force on the opposite ends of the powder column, relief valve RV-3 opens and the hydraulic and electrical components of the control circuit assume the positions shown respectively in FIGS. 2 and 2A. When relief valve RV-3 opens, flow switch FC closes the Press Complete contacts in the electrical control circuit (reference line 1 of FIG. 2A). The closing of these contacts is a signal that at this point in the cycle the preset press pressure (determined by the setting of valve RV-3) has been obtained and the compact 22 is ready to be ejected. The closing of the Press Complete contacts energizes relay 1CR which in turn closes contacts 1CR-1, 1CR-2 and 1CR-3 in reference lines 2, 3 and 8 of FIG. 2A and opens contacts 50 in reference line 6. The closing of Press Complete contacts also actuates a timer (not shown) controlling contacts 1CR-4T (reference line 9). Contacts 1CR-1 are holding contacts for relay 1CR. Contacts 1CR-2 preset the subsequent sequence of relay 2CR. Contacts 1CR-3 energize solenoid BV-3. The opening of contacts 50 deenergizes solenoid DV-1B and allows directional valve DV-1 to shift to the center position where both of its cylinder ports are vented to tank. This causes check valves POC-1 and POC-2 to close so that the cap end and rod end of the upper ram cylinder are isolated from the power unit HP and tank. Since solenoid BV-3 is energized to establish communication between the rod end of the upper ram cylinder and power unit HP, reducing valve RV-2 becomes operative and directs pressure fluid to the rod end of the cylinder of ram R-1. Solenoid DV-2B remains energized, thus maintaining maximum pressure on the cap end of the lower ram cylinder R2.

Figure 3:
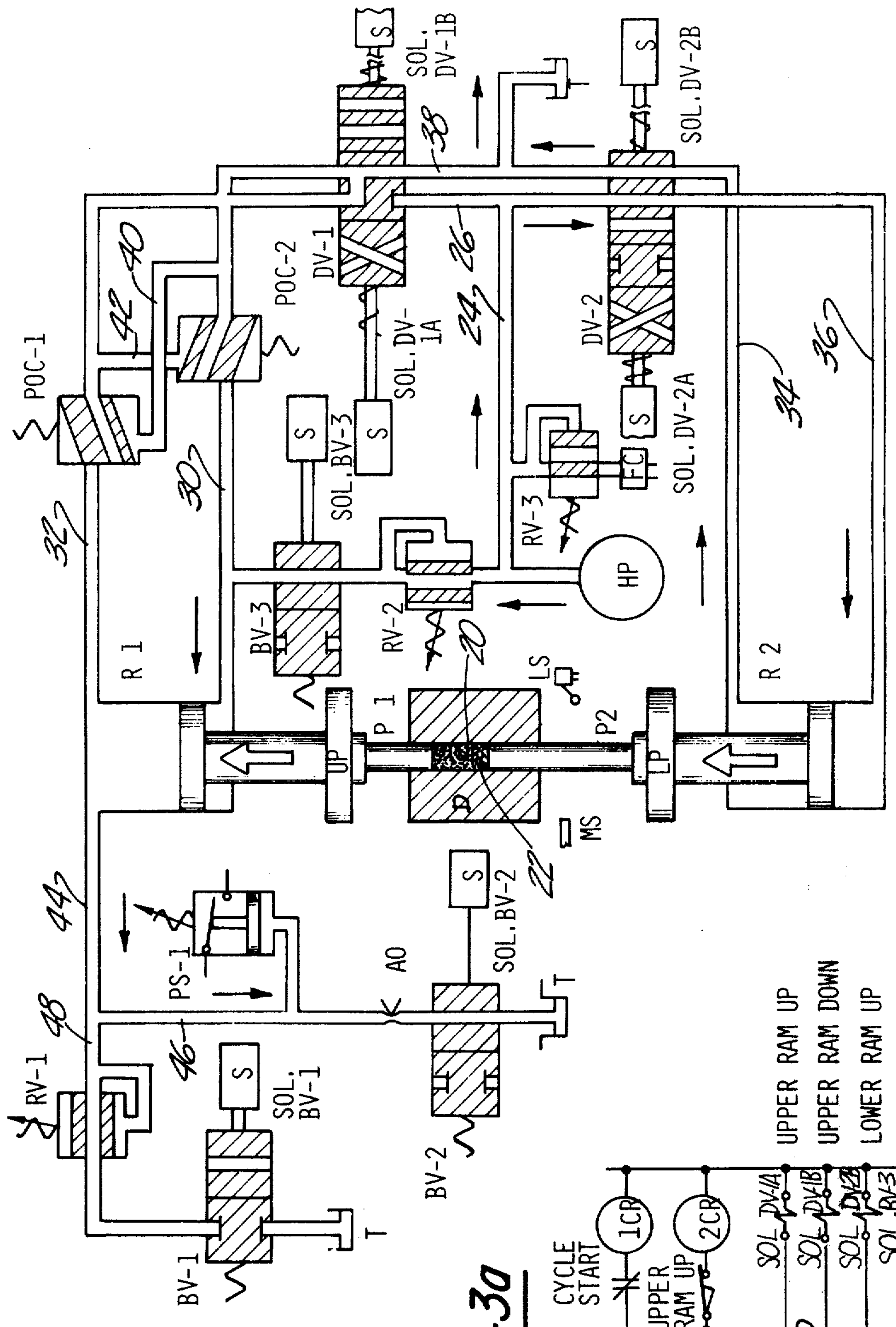
Figure 3A:
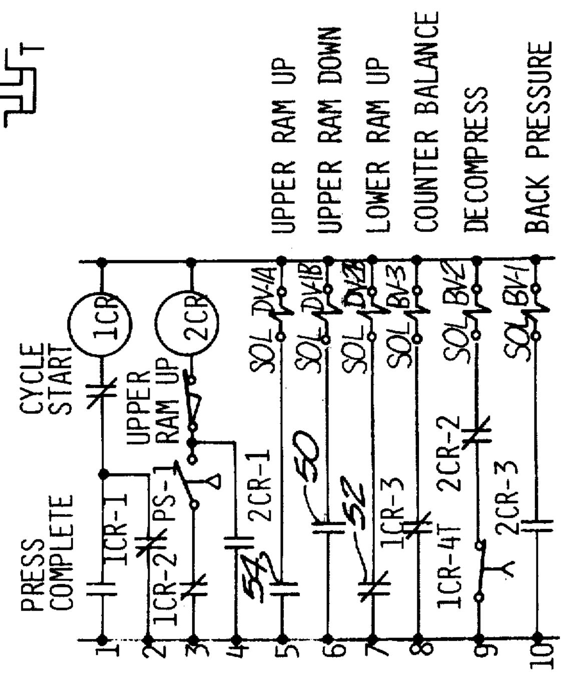

In the condition of the circuit illustrated in FIG. 2 an upward counterbalancing force is applied to the upper ram R1 through the rod end of its cylinder. This upward force on ram R1 causes a decrease in the hold down force exerted by the upper punch P1 on the compact and, thus, initiates decompression of the powder compact 22. The amount of counterbalancing force applied to the upper ram may be varied by adjusting the setting of reducing valve RV-2. When this counterbalancing force is applied to the bottom side of the upper ram, the pressure in the cap end of the lower ram cylinder decreases to a value below the setting of relief valve RV-3 and the Press Complete contacts open as illustrated in FIGS. 3 and 3A. However, the holding contacts 1CR-1 keep relay 1CR energized.

Subsequent to the opening of the Press Complete contacts, the timer controlled contacts 1CR-4T (reference line 9) close. When contacts 1CR-4T close they energize solenoid BV-2 to shift blocking valve BV-2 to the open position, allowing the trapped oil under pressure in the cap end of the upper ram cylinder to vent to tank through the adjustable orifice AO. This in turn controls the rate of decompression of the compact 22. Adjustable orifice AO can be adjusted to produce a very rapid pressure drop in the cap end of the upper ram cylinder. However, the drop in pressure is very smooth and does not produce any shock on the compact.

Figures 4, 4A:
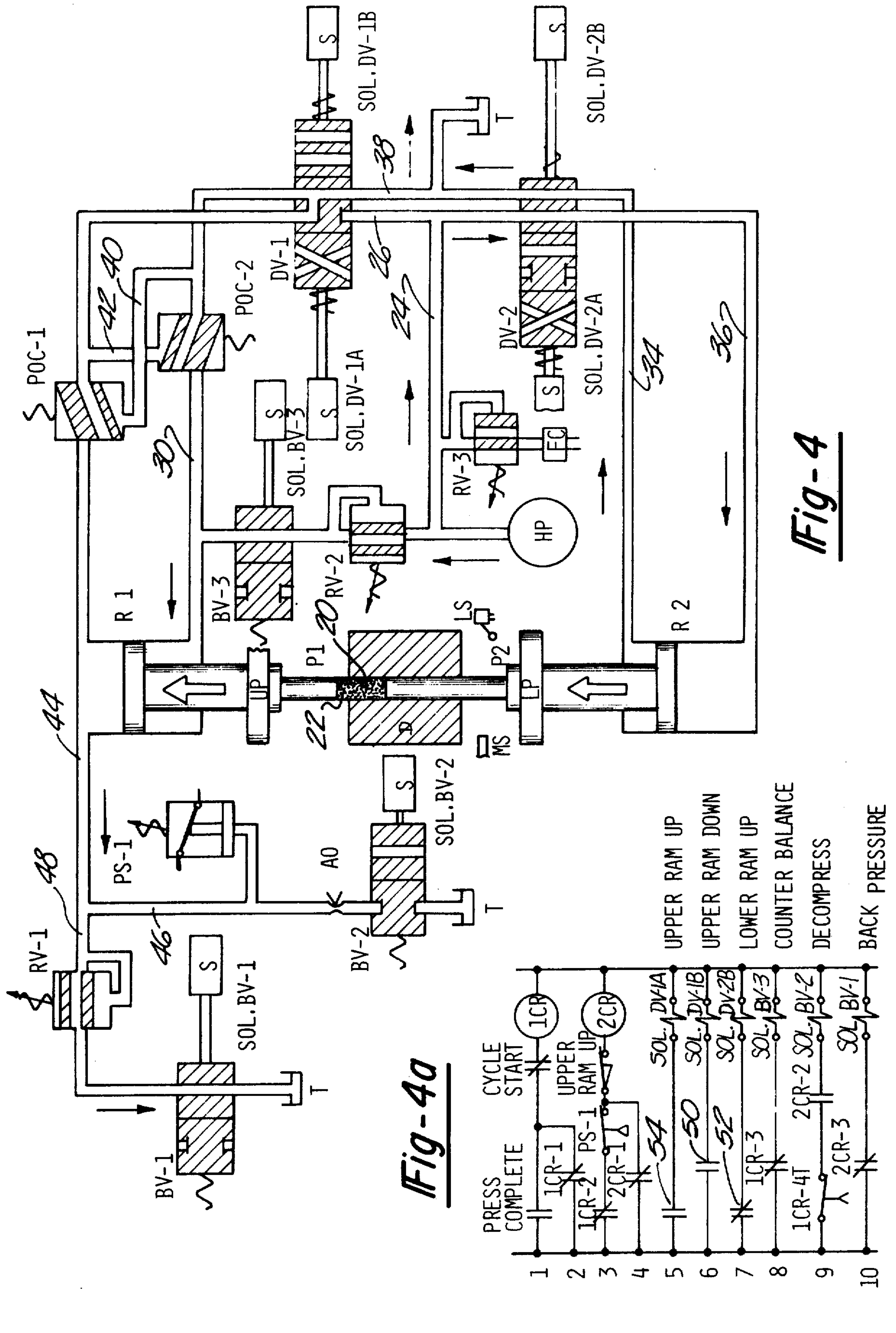
Figures 5, 5A:
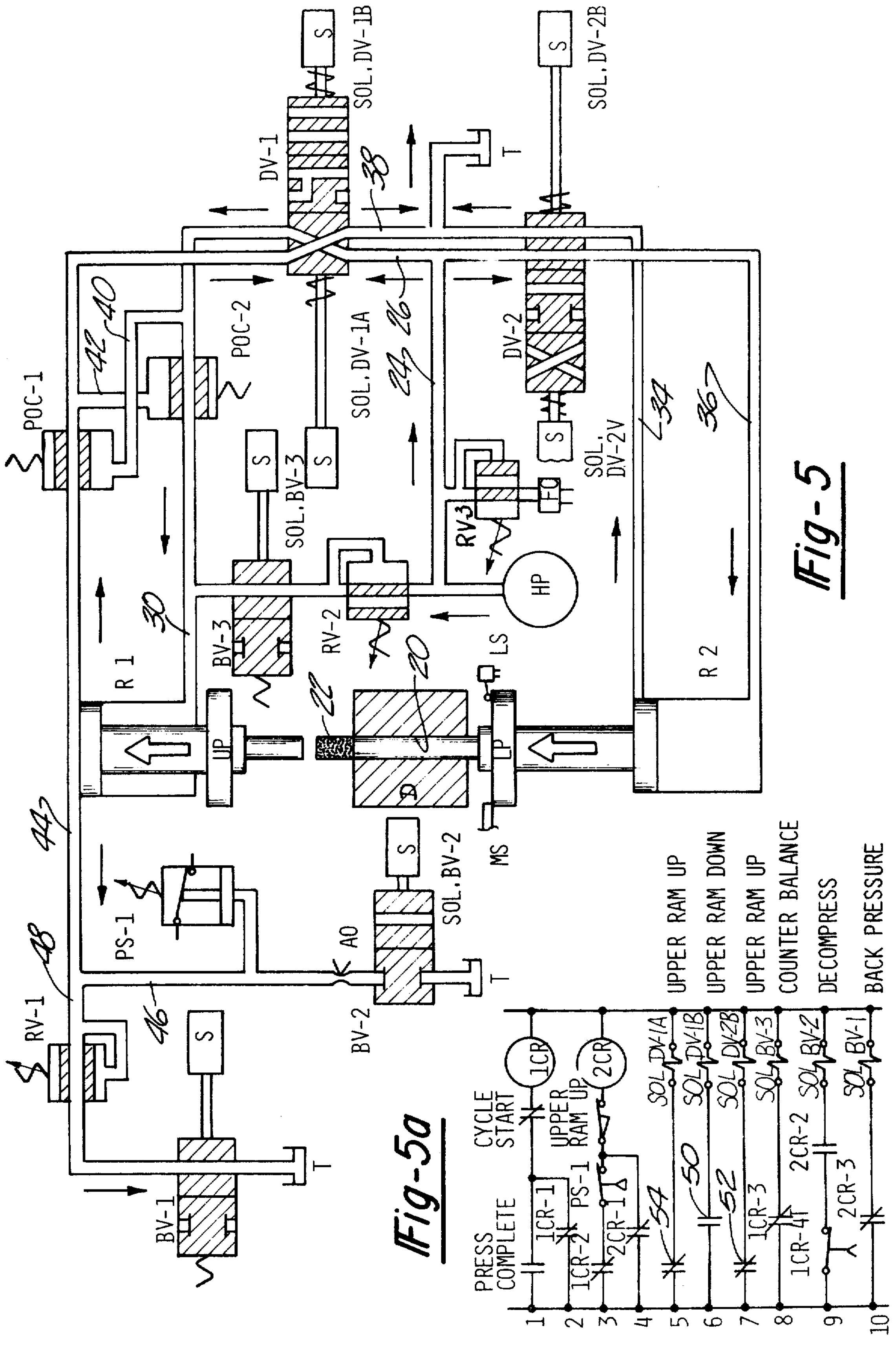

When the pressure in conduit 46 reaches a predetermined low value, pressure switch PS-1 closes and the components of the hydraulic and electrical control circuits assume the positions illustrated in FIGS. 4 and 4A. The point in the decompression portion of the cycle where pressure switch PS-1 closes may be varied by the setting of this pressure switch. This will of course vary depending upon the type of powder being compressed, the size of the compact, etc. From the standpoint of reducing the time cycle to a minimum without producing laminations in the compact, pressure switch PS-1 should preferably be set to close just before the upper end of the compact emerges from the upper end of the die cavity.

When pressure switch PS-1 closes it indicates that the pressure in the cap end of the upper ram cylinder has been reduced to the desired level to start the next sequence in the cycle which is the maintenance of back pressure on the cap end of the upper ram cylinder. The closing of pressure switch PS-1 energizes control relay 2CR which in turn closes contacts 2CR-1 and 2CR-3 and opens contacts 2CR-2. Contacts 2CR-1 are holding contacts for relay 2CR to maintain it energized in the event pressure switch PS-1 should open momentarily. When the normally closed contacts 2CR-2 (reference line 9) open, the solenoid of blocking valve BV-2 is deenergized, thus closing this valve and preventing further venting through the adjustable orifice AO. However, when contacts 2CR-3 (reference line 10) are closed, the solenoid of blocking valve BV-1 is energized which permits venting the cap end of the upper ram cylinder through discharge line 48. However, in this condition of the circuit all of the pressurized oil from the cap end of the upper ram cylinder must be exhausted through the back pressure relief valve RV-1. Accordingly, adjustable relief valve RV-1 is set to open at substantially the same pressure as pressure switch PS-1 closes so that the pressure in the cap end of the upper ram cylinder drops rapidly and smoothly to a predetermined value and is then maintained at the selected value during the remaining portion of the ejection portion of the cycle. As both rams move upwardly to eject the compact from the die the back pressure in the cap end of the upper ram cylinder is maintained at a relatively constant value determined by the setting of relief valve RV-1 to thereby cause the upper punch P1 to maintain a selected hold down force on the compact while it is being progressively ejected to a position out of the die cavity. The force exerted by the upper tooling on the compact during this phase of ejection is controlled by the differential force on the upper ram resulting from the pressure applied to the rod end of the upper ram cylinder through reducing valve RV-2 and the back pressure developed by relief valve RV-1. Since both of these values are adjustable, it follows that the lifting pressure on the upper ram and the back pressure on the upper ram can be varied as desired so that the hold down force on the compact is adjustable over a very wide range.

By controlling the hold down force exerted by the upper ram in the manner described shock on the compact resulting from erratic pressure reduction in the upper ram or a momentary pressure drop in the lower ram is completely eliminated. During ejection the hold down forces on the compact can be critically controlled at all times as a result of the controlled rate of decompression and the application of the desired back pressure. The decompression rate is adjustable and the degree of back pressure is also adjustable. Furthermore, during the complete ejection portion of the cycle the cap end of the lower ram cylinder is pressurized at all times so that the lower ram moves upwardly in a substantially continuous mode.

The use of means, such as the adjustable orifice AO, for controlling the rate of decompression down to the desired back pressure is particularly important in those systems where large amounts of oil are displaced. In such systems the use of a relief valve alone for controlling decompression can result in hydraulic shocks in the circuit which tend to initiate or produce laminations in the compact. It will be appreciated, however, that other hydraulic components may be utilized to obtain controlled decompression down to a desired back pressure.

When the compact 22 has been ejected upwardly to a position clear of the die the lower platen trips a limit switch LS and engages a mechanical stop MS. Limit switch LS in turn closes contacts 54 (reference line 5) which energize solenoid DV-1A so as to shift directional valve DV-1 to the position shown in FIG. 5. When this occurs the rod end of the upper ram cylinder is connected directly to the power unit HP and the cap end of the upper ram cylinder is exhausted to tank through both relief valve RV-1 and check valve POC-1. This results in a rapid return of the upper ram to its uppermost position at which point the compact can be removed from the die by any suitable means and the die cavity again filled with powder.

It will be apparent that the control circuits and the method of operation described eliminate the previously described problems which are encountered with presses as controlled and operated heretofore. With the present invention the compact is decompressed progressively, smoothly and at a rapid rate while it is still completely enclosed in the die cavity. By the time the compact starts emerging from the upper end of the die cavity, it has been decompressed to a predetermined low value (for example, 500 pounds per square inch) and, thereafter, the hold down force is maintained relatively constant as the compact progressively emerges from the upper end of the die cavity. By controlling the mode and rate of decompression of the compact and the back pressure thereon in the manner described consistently acceptable compacts can be produced with a minimum time cycle. Defects such as cracks and laminations are reduced to a minimum and the compacts are of a consistently uniform quality.

In this description and the appended claims the terms "upper" and "lower" are used only for reference purposes. It will be appreciated that the press rams need not be arranged for travel on a vertical axis; it is also possible to eject the compact downwardly rather than upwardly through the die. Accordingly, in this description and the appended claims the "upper end of the die cavity" is intended to mean the end of the die cavity through which the compact is ejected, regardless of the orientation of the die. Likewise, the term "upper ram" merely designates the ram which is retracted during ejection of the compact and the term "lower ram" is used to designate the ram which moves in the same direction for both pressing and ejecting the compact.

I claim:

1. The method of compressing powder in the cavity of a die to form a powder compact by the application of compacting forces to the opposite ends of a powder column in the cavity by means of vertically aligned and axially opposed plungers driven by upper and lower opposed rams of a hydraulic press, which comprises:

a. applying progressively increasing hydraulic pressure from a pressure source to cap ends of both ram cylinders to thereby move said plungers axially toward each other in said cavity and axially compress the powder therebetween;

b. isolating the cap end of the upper ram cylinder from said pressure source in response to the pressure therein reaching a predetermined high value corresponding to the desired maximum compacting force on the powder column;

c. then, while continuing the application of said hydraulic pressure to the cap end of said lower cylinder, directing fluid from said source to a rod end of the upper ram cylinder at a predetermined pressure below the pressure of the fluid in the cap end of the upper ram cylinder and simultaneously discharging fluid at a predetermined controlled rate from the cap end thereof until the pressure therein decreases to a predetermined low value whereby to initiate upward ejection of the compact from the cavity and to apply an upward counterbalancing force to the upper ram and thereby reduce the compacting force on the compact to a predetermined low value substantially greater than gravitational force thereon due to the weight of the upper plunger and ram, said predetermined lower hydraulic pressure being controlled such that the compacting force on the compact is reduced to said predetermined low value before the upper end of the compact emerges from an upper end of the cavity;

d. maintaining said low compacting force on the compact substantially uniform by discharging fluid from the cap end of the upper ram cylinder at a rate to maintain the pressure therein relatively constant while continuing to direct fluid from said pressure source to the rod end of the upper ram cylinder at said lower pressure and to the cap end of the lower ram cylinder to thereby move both rams and the compact upwardly at the same rate while maintaining a substantially uniform hold down force on the upper end of the compact;

e. thereafter, increasing the rate of discharge of fluid from the cap end of the upper ram cylinder to reduce the force applied to the compact to zero.

2. The method of claim 1 wherein said discharge of fluid from the cap end of the upper ram cylinder at said predetermined controlled rate is initiated after the elapse of a predetermined time interval following the isolation of the cap end of the upper ram cylinder from said pressure source and the application of said lower pressure to the rod end of the upper ram cylinder.

3. The method of claim 1 wherein the pressure in the cap end of the upper ram cylinder is maintained at said relatively constant value by directing the discharge from the upper ram cylinder through a relief valve controlled by the pressure in the cap end of the upper ram cylinder.

4. The method of claim 1 wherein the rate of discharge of fluid from the cap end of the upper ram cylinder is controlled in relation to the rate at which fluid is supplied to the rod end thereof so that the pressure in the cap end of the upper ram cylinder is decreased progressively and smoothly to said predetermined low value.

5. The method of claim 4 wherein the rate of discharge of fluid from the cap end of the upper ram cylinder is increased when the compact is substantially completely ejected from the die cavity.

6. The method of claim 4 including the step of continuing the supply of fluid to the cap end of the lower ram cylinder during all of the aforementioned steps whereby to move the lower ram upwardly in a substantially continuous mode during both compression and ejection of the compact.

7. The method of claim 2 wherein the pressure in the cap end of the upper ram cylinder is decreased progressively to said predetermined low value by discharging fluid therefrom to tank through a restricted orifice.

8. The method of claim 7 wherein the pressure in the cap end of the upper ram cylinder is maintained at said relative constant value by directing the discharge from the upper ram cylinder to tank through a relief valve controlled by the pressure in the upper ram cylinder.

9. The method of claim 8 wherein the discharge flow through said orifice is arrested when the flow is directed through said relief valve.

* * * * *